United States Patent
Donaldson et al.

(10) Patent No.: US 12,017,754 B2
(45) Date of Patent: Jun. 25, 2024

(54) DOWNLOAD REDUCING WINGTIPS

(71) Applicants: Bell Textron Inc., Fort Worth, TX (US); Textron Aviation Inc., Wichita, KS (US)

(72) Inventors: Kent E. Donaldson, Fort Worth, TX (US); Phillip A. Kendrick, Wichita, KS (US); Kyle Smolarek, Fort Worth, TX (US)

(73) Assignee: Textron Innovations Inc., Providence, RI (US)

( * ) Notice: Subject to any disclaimer, the term of this patent is extended or adjusted under 35 U.S.C. 154(b) by 1141 days.

(21) Appl. No.: 16/816,577

(22) Filed: Mar. 12, 2020

(65) Prior Publication Data
US 2021/0284328 A1  Sep. 16, 2021

(51) Int. Cl.
| | |
|---|---|
| *B64C 23/06* | (2006.01) |
| *B64C 27/00* | (2006.01) |
| *B64C 27/08* | (2023.01) |
| *B64C 27/26* | (2006.01) |
| *B64C 29/00* | (2006.01) |
| *B64U 10/10* | (2023.01) |

(52) U.S. Cl.
CPC .......... *B64C 23/065* (2013.01); *B64C 27/001* (2013.01); *B64C 27/08* (2013.01); *B64C 27/26* (2013.01); *B64C 29/00* (2013.01); *B64C 2027/002* (2013.01); *B64U 10/10* (2023.01)

(58) Field of Classification Search
CPC . B64C 21/10; B64C 23/065; B64C 2003/148; B64C 27/26
See application file for complete search history.

(56) References Cited

U.S. PATENT DOCUMENTS

| | | | | |
|---|---|---|---|---|
| 1,773,280 A | * | 8/1930 | Scott | B64C 3/14 244/35 R |
| 3,149,800 A | | 9/1964 | Sintes | |
| 3,369,775 A | * | 2/1968 | Rethorst | B64C 23/06 244/130 |
| 4,354,648 A | * | 10/1982 | Schenk | B64C 23/06 244/130 |
| 4,928,907 A | * | 5/1990 | Zuck | B64C 27/26 244/6 |
| 5,158,251 A | * | 10/1992 | Taylor | B64C 23/065 244/207 |
| 5,267,626 A | | 12/1993 | Tanfield, Jr. | |
| 5,634,613 A | * | 6/1997 | McCarthy | B64C 23/069 244/46 |
| 6,607,168 B1 | * | 8/2003 | Cordier | B64C 23/06 244/199.1 |

(Continued)

OTHER PUBLICATIONS

Donaldson, Kent E., et al.; "Download Reducing Winglets"; U.S. Appl. No. 16/797,342; filed on Feb. 21, 2020; 35 pages.

*Primary Examiner* — Nicholas McFall
*Assistant Examiner* — Marisa V Conlon
(74) *Attorney, Agent, or Firm* — Bradley Arant Boult Cummings LLP

(57) ABSTRACT

An aircraft includes a wing positioned below a vertical rotor, the wing extending in a transverse direction to a wingtip having an outboard face, and a turbulence feature located on the wingtip and oriented to induce turbulence in the rotor downwash flowing across the outboard face in a direction from a top surface of the wing to a bottom surface of the wing.

12 Claims, 3 Drawing Sheets

(56) References Cited

U.S. PATENT DOCUMENTS

| | | | |
|---|---|---|---|
| 7,137,589 B2 | 11/2006 | Arata | |
| 7,988,100 B2 | 8/2011 | Mann | |
| 8,376,266 B2 | 2/2013 | Gemmati et al. | |
| 8,820,673 B2 * | 9/2014 | Cacciaguerra | B64C 39/062 |
| | | | 244/6 |
| 9,266,607 B2 * | 2/2016 | Fink | B64C 39/04 |
| 9,302,761 B2 * | 4/2016 | Isotani | B64C 9/16 |
| 9,714,080 B2 | 7/2017 | Bradshaw et al. | |
| 9,738,379 B2 | 8/2017 | Cacciaguera | |
| 9,868,516 B2 * | 1/2018 | Rosenberger | B64C 23/06 |
| 10,005,550 B2 * | 6/2018 | Toulmay | B64C 27/82 |
| 10,071,798 B2 * | 9/2018 | Zhong | F15D 1/08 |
| 10,266,252 B2 | 4/2019 | Anderson et al. | |
| 10,421,533 B2 * | 9/2019 | Domel | B64C 3/14 |
| 10,625,847 B2 * | 4/2020 | Dhandhania | B64C 23/069 |
| 10,988,235 B2 | 4/2021 | Fukari et al. | |
| 2002/0011539 A1 | 1/2002 | Carter | |
| 2005/0151001 A1 * | 7/2005 | Loper | B64C 27/26 |
| | | | 244/6 |
| 2006/0249630 A1 | 11/2006 | McCarthy | |
| 2007/0252031 A1 | 11/2007 | Hackett et al. | |
| 2008/0217485 A1 | 9/2008 | Ikeda | |
| 2008/0237392 A1 | 10/2008 | Piasecki et al. | |
| 2009/0065650 A1 * | 3/2009 | McKeon | F15D 1/12 |
| | | | 244/130 |
| 2010/0065677 A1 | 3/2010 | Ferrier | |
| 2014/0061366 A1 | 3/2014 | Fink et al. | |
| 2016/0272302 A1 | 9/2016 | Rosenberger et al. | |
| 2017/0291699 A1 | 10/2017 | Hunter et al. | |
| 2018/0050790 A1 | 2/2018 | Whitehouse et al. | |
| 2018/0281936 A1 | 10/2018 | Robertson et al. | |
| 2018/0304997 A1 | 10/2018 | Dhandhania | |
| 2020/0023946 A1 | 1/2020 | Anderson et al. | |
| 2020/0055595 A1 * | 2/2020 | Bailie | B64C 27/24 |

* cited by examiner

DOWNLOAD REDUCING WINGTIPS

TECHNICAL FIELD

This disclosure relates in general to the field of aircraft, and more particularly, to a vertical takeoff and landing aircraft with download reducing wingtips.

BACKGROUND

This section provides background information to facilitate a better understanding of the various aspects of the disclosure. It should be understood that the statements in this section of this document are to be read in this light, and not as admissions of prior art.

Fixed-wing aircraft, such as airplanes, are capable of flight using wings that generate lift responsive to the forward airspeed of the aircraft, which is generated by thrust from one or more jet engines or propellers. The wings generally have an airfoil cross section that deflects air downward as the aircraft moves forward, generating the lift force to support the aircraft in flight. Fixed-wing aircraft, however, typically require a runway that is hundreds or thousands of feet long for takeoff and landing.

Unlike fixed-wing aircraft, vertical takeoff and landing (VTOL) aircraft do not require runways. Instead, VTOL aircraft are capable of taking off, hovering and landing vertically. One example of a VTOL aircraft is a helicopter which is a rotorcraft having one or more rotors that provide lift and thrust to the aircraft. The rotors not only enable hovering and vertical takeoff and landing, but also enable forward, backward and lateral flight. These attributes make helicopters highly versatile for use in congested, isolated or remote areas.

Tiltrotor aircraft include proprotors that can change their plane of rotation based on the operation being performed. Tiltrotor aircraft generate lift and propulsion using proprotors that are typically coupled to nacelles mounted near the ends of a fixed wing. The proprotors rotate relative to the fixed wing such that the proprotors have a generally horizontal plane of rotation for vertical takeoff, hovering and landing and a generally vertical plane of rotation while cruising in forward flight, wherein the fixed wing provides lift and the proprotors provide forward thrust. In this manner, tiltrotor aircraft combine the vertical lift capability of a helicopter with the speed and range of fixed-wing aircraft.

SUMMARY

An exemplary aircraft includes a wing positioned below a vertical rotor, the wing extending in a transverse direction to a wingtip having an outboard face, and a turbulence feature located on the wingtip and oriented to induce turbulence in the rotor downwash flowing across the outboard face in a direction from a top surface of the wing to a bottom surface of the wing.

Another exemplary aircraft includes a vertical rotor in operation producing a rotor downwash, a wing positioned below the vertical rotor and extending in a transverse direction to a wingtip, and an outboard face of the wingtip contoured to promote wingtip lift in response to the rotor downwash flowing across the outboard face in a direction from a top surface of the wing to a bottom surface of the wing.

This summary is provided to introduce a selection of concepts that are further described below in the detailed description. This summary is not intended to identify key or essential features of the claimed subject matter, nor is it intended to be used as an aid in limiting the scope of claimed subject matter.

BRIEF DESCRIPTION OF THE DRAWINGS

The disclosure is best understood from the following detailed description when read with the accompanying figures. It is emphasized that, in accordance with standard practice in the industry, various features are not drawn to scale. In fact, the dimensions of various features may be arbitrarily increased or reduced for clarity of discussion.

DETAILED DESCRIPTION

Figure 1:
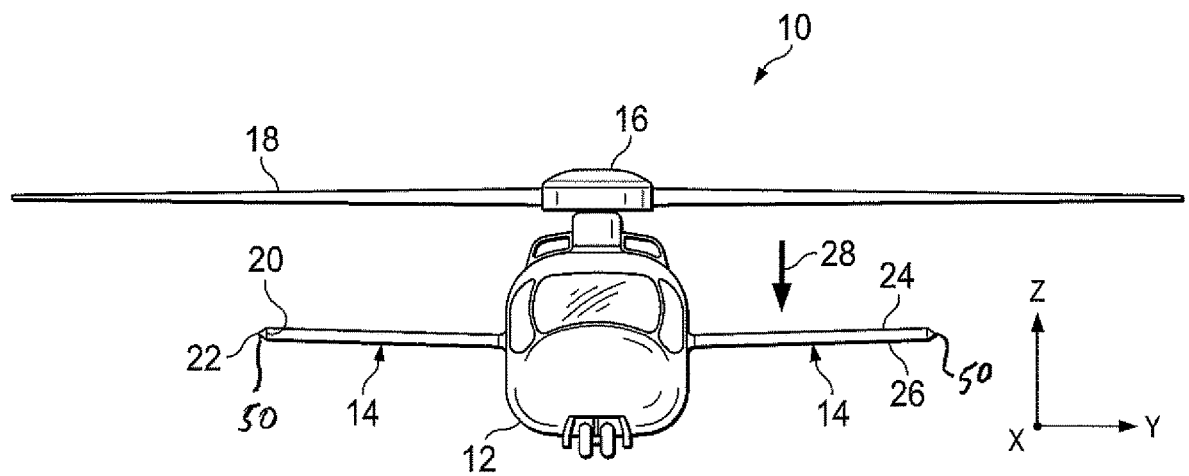
FIG. 1 illustrates an exemplary aircraft incorporating download reducing wingtips.

It is to be understood that the following disclosure provides many different embodiments, or examples, for implementing different features of various illustrative embodiments. Specific examples of components and arrangements are described below to simplify the disclosure. These are, of course, merely examples and are not intended to be limiting. For example, a figure may illustrate an exemplary embodiment with multiple features or combinations of features that are not required in one or more other embodiments and thus a figure may disclose one or more embodiments that have fewer features or a different combination of features than the illustrated embodiment. Embodiments may include some but not all the features illustrated in a figure and some embodiments may combine features illustrated in one figure with features illustrated in another figure. Therefore, combinations of features disclosed in the following detailed description may not be necessary to practice the teachings in the broadest sense and are instead merely to describe particularly representative examples. In addition, the disclosure may repeat reference numerals and/or letters in the various examples. This repetition is for the purpose of simplicity and clarity and does not itself dictate a relationship between the various embodiments and/or configurations discussed.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "inboard," "outboard," "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction. As used herein, the terms "connect," "connection," "connected," "in connection with," and "connecting" may be used to mean in direct connection with or in connection with via one or more elements. Similarly, the terms "couple," "coupling," and "coupled" may be used to mean directly coupled or coupled via one or more elements.

FIG. 1 depicts three mutually orthogonal directions X, Y, and Z forming a three-dimensional frame of reference XYZ. Longitudinal axis X corresponds to the roll axis that extends through the center of aircraft 10 in the fore and aft directions. Transverse axis Y is perpendicular to longitudinal axis X and corresponds to the pitch axis (also known as a control pitch axis or "CPA"). The X-Y plane is considered to be "horizontal." Vertical axis Z is the yaw axis and is oriented perpendicularly with respect to the X-Y plane. The X-Z plane and Y-Z plane are considered to be "vertical."

FIG. 1 illustrates an exemplary aircraft 10, shown as a helicopter, incorporating download reducing wingtips. Aircraft 10 includes a fuselage 12, a left wing 14, right wing 14, and a vertical rotor 16 including rotor blades 18. Wings 14 are located below vertical rotor 16, at least in the hover mode, and the wing extends outward from fuselage 12 in the transverse direction Y to wingtips 20. Wingtips 20 have an outboard face 22 extending between the top surface 24 and the bottom surface 26 of wing 14. Operating vertical rotor 16 produces a rotor downwash 28. The pitch of vertical rotor 16 may be changed to direct rotor downwash 28 to operate the aircraft in hover mode or a cruise mode (forward, reverse, and side flight).

Aircraft 10 is illustrated as a helicopter for purposes of description, however, the aircraft is not limited to helicopters. Aircraft 10 includes, without limitation, vertical takeoff and landing aircraft, helicopters, tiltrotors, and rotorcrafts. Download reducing winglets 50 may be utilized in any aircraft that has wings located below a vertical rotor. Vertical rotor is used herein to denote rotors or fans (e.g., ducted fans) that are positioned, temporarily or permanently, above a wing.

When the aircraft is hovering the pitch of the vertical rotor 16 direct rotor downwash 28 vertically against top surface 24 of wings 14 producing a greater download than when the aircraft is in forward flight. Wingtip 20 includes one or more features configured to reduce the download produced by the rotor downwash when the aircraft is hovering. An exemplary outboard face 22 is contoured to promote localized lift at the wingtip in response to the rotor downwash flowing across the outboard face in the direction from the top surface of the wing to the bottom surface. Another exemplary wingtip 20 includes a turbulence feature oriented to induce turbulence in the rotor downwash flowing across the outboard face in the direction from the top surface of the wing to the bottom surface. Another exemplary wingtip includes a turbulence feature and a contoured outboard face.

Figure 2:
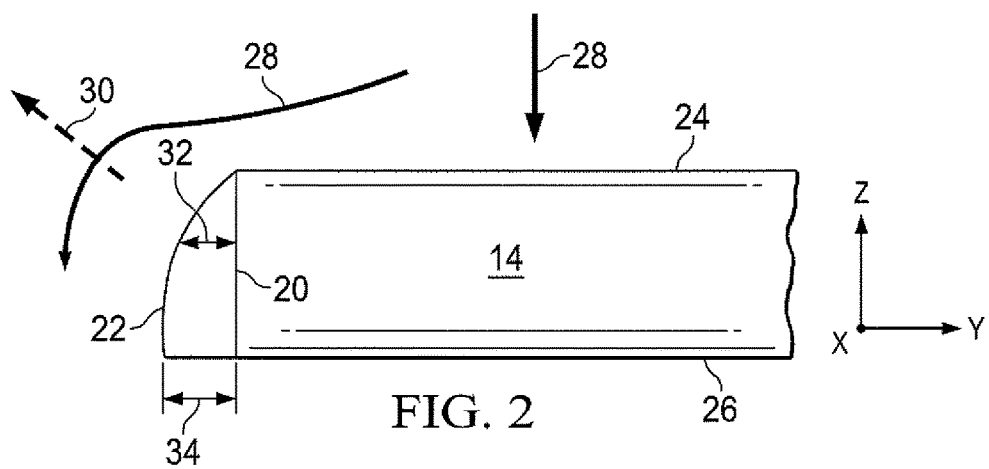
FIG. 2 is a schematic illustration of a side view of an exemplary download reducing wingtip.

FIG. 2 illustrates a portion of a wing 14. Wingtip 20 has a contoured, non-planar, outboard face 22. Rotor downwash 28 is directed vertically against top surface 24 and flows outboard in the transverse direction Y across wingtip 20 and outboard face 22 in the direction from top surface 24 to bottom surface 26. The flow of rotor downwash in the vertical direction across wingtip 20 may create a low pressure zone producing wingtip lift 30 countering a portion of the download. In some embodiments, outboard face 22 is contoured to promote creating wingtip lift. In the example of FIG. 2, outboard face 22 has an airfoil shape with a first thickness 32 located proximate to top surface 24 and a second thickness 34 located proximate to bottom surface 26, where first thickness 32 and second thickness 34 are different. In FIG. 2, the first thickness 32 is greater than second thickness 34. As will be understood by those skilled in the art with benefit of this disclosure, the contour of outboard face 22 may be varied to achieve optimal wingtip lift in response to rotor downwash 28. In the FIG. 2 example, wingtip 20 does not include a turbulence feature, however, in some embodiments wingtip 20 includes a turbulence feature.

Figure 3:
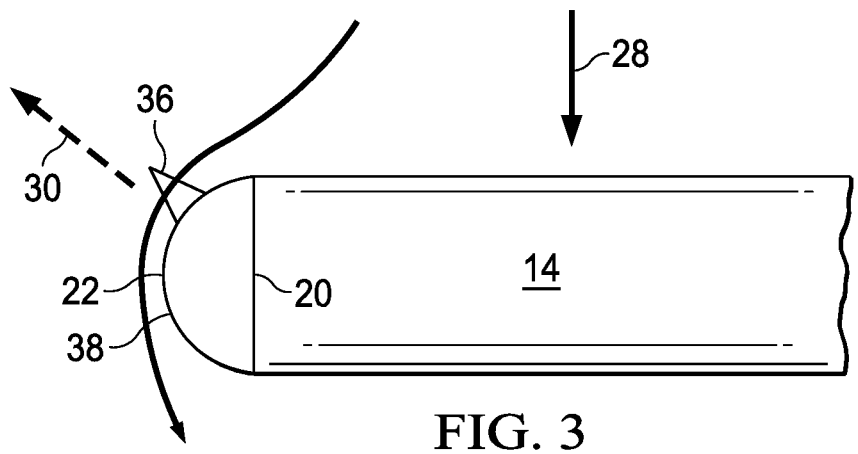
FIG. 3 is a schematic illustration of a side view of another exemplary download reducing wingtip.

FIG. 3 illustrates another exemplary wingtip 20. In this embodiment, wingtip 20 includes a turbulence feature, generally denoted by the numeral 36. Turbulence feature 36 is located on outboard face 22 in this exemplary wingtip. The outboard face may be planar or non-planar face and is illustrated as a noon-planar contoured face in FIG. 3. Turbulence feature 36 may be located on wingtip 20 above outboard face 22. A boundary layer 38 is formed along outboard face 22 as rotor downwash 28 flows vertically downward across wingtip 20 and outboard face 22. The surface area of the top surface of wing 14 presents a blunt or spherical profile to the flow of rotor downwash 28, which may result in a premature separation of the flow from outboard face 22 increasing the downward pressure drag on wingtip 20 and wing 14. Turbulence feature 36 is provided to trigger or induce turbulence in boundary layer 38 delaying separation of the flow from outboard face 22 thereby reducing the pressure drag and reduce rotor downwash produced download.

Turbulence feature 36 may take various forms including without limitation, surface roughness, trip strips and vortex generators. Turbulence feature 36 may be positioned at various locations on wingtip 20. In an exemplary embodiment, turbulence feature 36 is positioned on outboard face 22 proximate top surface 24.

Figure 4:
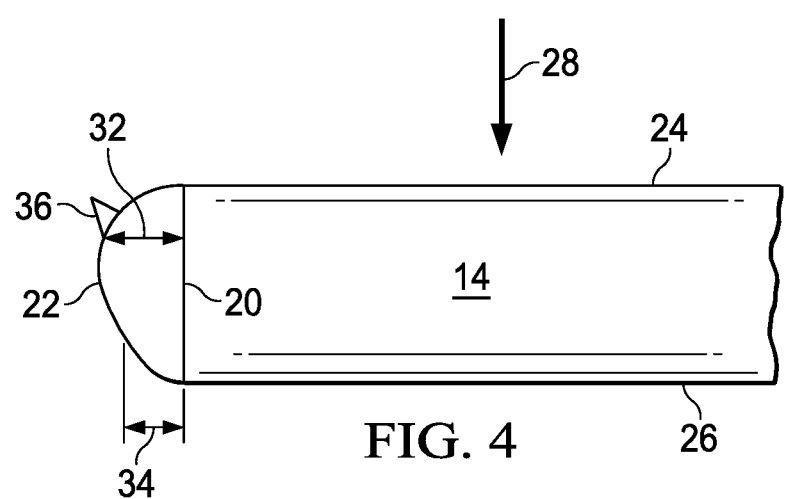
FIG. 4 is a schematic illustration of a side view of another exemplary download reducing wingtip.

FIG. 4 illustrates another example of a download reducing wingtip 20 including an outboard face 22 contoured to promote creating wingtip lift 30 in response to rotor downwash 28 and a turbulence feature 36. In the example of FIG. 4, contoured outboard face 22 has a first thickness 32 located proximate to top surface 24 and a second thickness 34 located proximate to bottom surface 26. First thickness 32 and second thickness 34 are different. In FIG. 4, first thickness 32 is less than second thickness 34.

Figure 5:
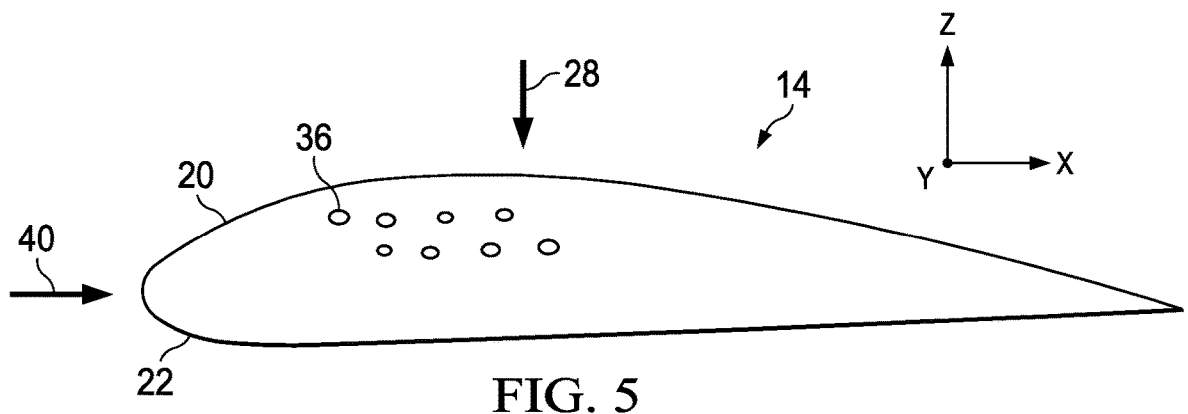
FIG. 5 is a schematic illustration of an end view of an exemplary download reducing wingtip with a turbulence feature.
Figure 6:
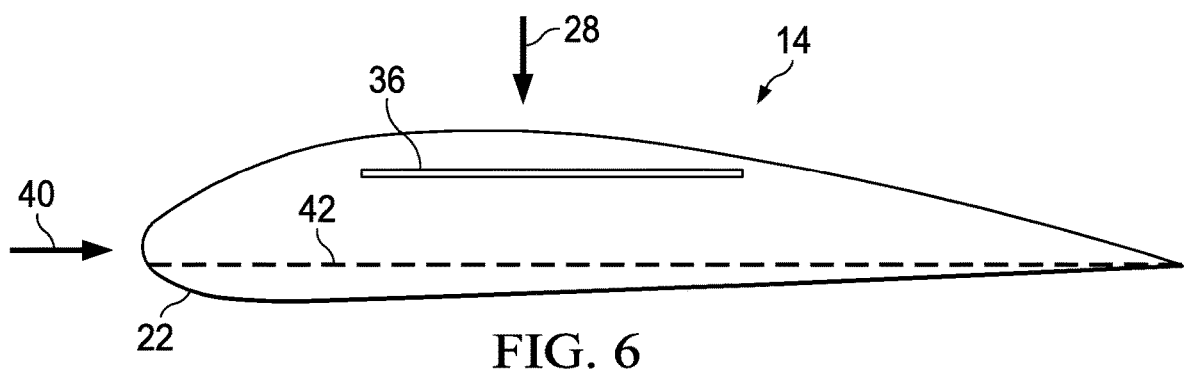
FIG. 6 is a schematic illustration of an end view of another exemplary download reducing wingtip with a turbulence feature.
Figure 7:
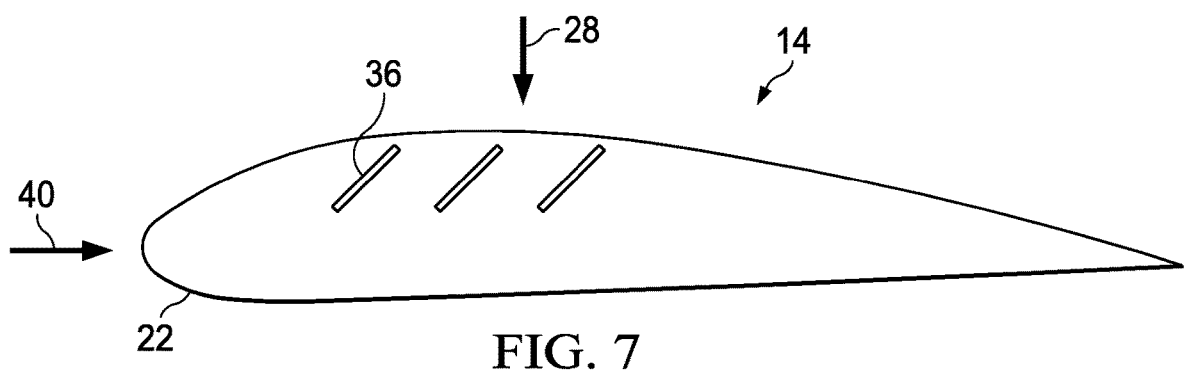
FIG. 7 is a schematic illustration of an end view of another exemplary download reducing wingtip with a turbulence feature.

FIGS. 5-7 are side views of exemplary outboard faces 22 illustrating different types of turbulence features 36. FIG. 5 illustrates a turbulence feature 36 in the form of surface roughness. The surface roughness of outboard face 22 may be increased in various manners. Examples of surface roughness features include dimples or divots, and a rough texture. Surface roughness may provide the benefit of tripping the boundary layer in rotor downwash 28 and also produce efficiencies when the aircraft is in forward flight as indicated by the forward streamline 40.

FIG. 6 schematically illustrates a turbulence feature 36 in the form of a trip strip. In this example, a single trip strip is used, however, more than one trip strip may be used. Trip strip 36 may take different forms and is generally a structure, for example a ridge or wall, having a height to extend into the boundary layer.

Trip strip 36 in this example is located on outboard face 22 of wingtip 20. Trip strip 36 extends generally in the longitudinal direction and generally perpendicular to rotor downwash 28 when hovering. Trip strip 36 may be oriented to extend parallel, or generally parallel, to the forward cruise streamline 40 when the aircraft is at the maximum cruise speed and attitude. Trip strip may be oriented generally parallel to the chord 42 of wing 14. The orientation of trip strip 36 may be determined to produce the desired benefits during hover and minimize any ill effects in forward flight.

FIG. 7 illustrates another example of a turbulence feature 36 in the form of a vortex generator. Vortex generator 36 may include for example one or more raised structures oriented obliquely to rotor downwash 28 to create a vortex in the rotor downwash boundary layer downstream of the vortex generator. The vortex generator may be oriented to have limited effect during forward flight or to act as a turbulence feature in the forward flight streamline 40.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include such elements or features.

The term "substantially," "approximately," and "about" is defined as largely but not necessarily wholly what is specified (and includes what is specified; e.g., substantially 90 degrees includes 90 degrees and substantially parallel includes parallel), as understood by a person of ordinary skill in the art. The extent to which the description may vary will depend on how great a change can be instituted and still have a person of ordinary skill in the art recognized the modified feature as still having the required characteristics and capabilities of the unmodified feature. In general, but subject to the preceding, a numerical value herein that is modified by a word of approximation such as "substantially," "approximately," and "about" may vary from the stated value, for example, by 0.1, 0.5, 1, 2, 3, 4, 5, 10, or 15 percent.

The foregoing outlines features of several embodiments so that those skilled in the art may better understand the aspects of the disclosure. Those skilled in the art should appreciate that they may readily use the disclosure as a basis for designing or modifying other processes and structures for carrying out the same purposes and/or achieving the same advantages of the embodiments introduced herein. Those skilled in the art should also realize that such equivalent constructions do not depart from the spirit and scope of the disclosure and that they may make various changes, substitutions, and alterations without departing from the spirit and scope of the disclosure. The scope of the invention should be determined only by the language of the claims that follow. The term "comprising" within the claims is intended to mean "including at least" such that the recited listing of elements in a claim are an open group. The terms "a," "an" and other singular terms are intended to include the plural forms thereof unless specifically excluded.

What is claimed is:

1. An aircraft comprising:
a vertical rotor in operation producing a rotor downwash;
a wing positioned below the vertical rotor and extending in a transverse direction to a wingtip having an outboard face; and
a fixed turbulence feature located on the outboard face of the wingtip and extending transversely outboard from the outboard face, the turbulence feature oriented to induce turbulence in the rotor downwash flowing across the outboard face in a direction from a top surface of the wing to a bottom surface of the wing;
wherein the outboard face of the wingtip comprises a contoured curved shape extending from the top surface to the bottom surface to promote wingtip lift in response to the rotor downwash flowing across the outboard face in a direction from a top surface of the wing to a bottom surface of the wing.

2. The aircraft of claim 1, wherein the fixed turbulence feature is a surface roughness feature.

3. The aircraft of claim 2, wherein the surface roughness feature comprises a plurality of dimples.

4. The aircraft of claim 1, wherein the fixed turbulence feature comprises a ridge.

5. The aircraft of claim 4, wherein the ridge extends generally parallel to a chord of the wing.

6. The aircraft of claim 1, wherein the fixed turbulence feature is a ridge oriented obliquely to the rotor downwash.

7. The aircraft of claim 1, wherein the outboard face is contoured with a first transverse thickness proximate the top side and a second transverse thickness proximate the bottom side, the first transverse thickness greater than the second transverse thickness.

8. The aircraft of claim 1, wherein the outboard face is contoured with a first transverse thickness proximate the top side and a second transverse thickness proximate the bottom side, the first transverse thickness less than the second transverse thickness.

9. The aircraft of claim 1, wherein the contoured outboard face has a first transverse thickness proximate the top surface and a second transverse thickness proximate the bottom surface, wherein the first transverse thickness is different from the second transverse thickness.

10. The aircraft of claim 1, wherein the contoured outboard face has a first transverse thickness proximate the top surface and a second transverse thickness proximate the bottom surface, wherein the first transverse thickness is different from the second transverse thickness; and the fixed turbulence feature is a surface roughness feature on the outboard face.

11. The aircraft of claim 1, wherein the contoured outboard face has a first transverse thickness proximate the top surface and a second transverse thickness proximate the bottom surface, wherein the first transverse thickness is different from the second transverse thickness; and the fixed turbulence feature is a raised structure positioned on the outboard face.

12. The aircraft of claim 11, wherein the raised structure is oriented obliquely to the rotor downwash.

* * * * *